US006488264B2

(12) United States Patent
Wiklund

(10) Patent No.: US 6,488,264 B2
(45) Date of Patent: Dec. 3, 2002

(54) GOVERNOR VALVE DEVICE IN A PRESSURE FLUID OPERATED TOOL

(76) Inventor: Henry Wiklund, Backvagen 1, S-820 10 Arbra (SE)

( * ) Notice: Subject to any disclaimer, the term of this patent is extended or adjusted under 35 U.S.C. 154(b) by 8 days.

(21) Appl. No.: 09/858,679

(22) Filed: May 16, 2001

(65) Prior Publication Data

US 2001/0048092 A1 Dec. 6, 2001

(30) Foreign Application Priority Data

Jun. 6, 2000 (SE) ............................................ 0002090

(51) Int. Cl.[7] ............................................ F16K 31/44

(52) U.S. Cl. ...................... 251/218; 251/227; 251/321; 137/901; 91/426; 91/428; 91/469; 173/13; 173/114; 173/168

(58) Field of Search ................................ 251/321, 227, 251/218; 137/901; 91/469, 470, 428, 426; 173/168, 169, 114, 13, 121

(56) References Cited

U.S. PATENT DOCUMENTS

| | | | | | |
|---|---|---|---|---|---|
| 2,598,417 | A | * | 5/1952 | Niemann | 251/321 |
| 3,861,476 | A | * | 1/1975 | Borsum | 173/169 |
| 4,117,764 | A | | 10/1978 | Nilsson et al. | |
| 4,243,111 | A | * | 1/1981 | Willoughby et al. | 173/169 |
| 4,444,091 | A | * | 4/1984 | Jorgensen, Jr. | 173/169 |
| 5,971,083 | A | * | 10/1999 | Wiklund | 173/13 |
| 6,164,387 | A | * | 12/2000 | Chang | 173/169 |

* cited by examiner

*Primary Examiner*—Henry C. Yuen
*Assistant Examiner*—John Bastianelli
(74) *Attorney, Agent, or Firm*—Mark P. Stone

(57) ABSTRACT

Governor valve device for a pressure fluid operated tool having a ball valve (23, 24), the valve ball (24) of which is provided in a cavity (25), open towards the seal ring (23) of the valve, in a movable piston (26). A spring-loaded member (30) urges the valve ball against the seal ring. By movement of the piston, the ball can be moved out of and into, respectively, a sealing position against the seal ring in order to permit and to prevent, respectively, the passage of pressure fluid to a drive chamber (17) in the tool.

18 Claims, 1 Drawing Sheet

GOVERNOR VALVE DEVICE IN A PRESSURE FLUID OPERATED TOOL

SUMMARY OF THE INVENTION

The present invention relates to a governor valve. It is known, in pressure fluid operated tools, to arrange, in different ways, a governor comprising a piston which is movable in two opposed directions to open and to close, respectively, a supply channel for pressure fluid which leads to a drive chamber and a drive mechanism arranged in the tool.

The present invention aims at arranging, particularly in smaller, long and narrow pressure fluid operated tools, such as a pressure fluid operated engraving pen, a governor valve having a movable piston extending transversally through the housing of the tool and having the advantages that, for one thin, it can be located easily accessible for the fingers of the operator during operation of the tool, and for another thing, that it protrudes only slightly from the tool housing through which it extends and will therefore not be unwieldy and spoil the appearance of the tool. As the piston is only required to perform small movements, it is possible to use the device in accordance with the invention also in narrow tools—such as, for example, an engraving pen—the housings of which have a small thickness of the walls through which the piston extends and therefore have little room for movements of seal rings fitted on the piston without these rings coming outside the walls. These advantages have been obtained with the device in accordance with the present invention.

The governor valve device in accordance with the invention is described in closer detail below, with reference to the attached drawing, which shows a pressure fluid operated engraving pen provided with said device. The device can also be used in other types of pressure fluid operated tools and devices and be varied in its design within the scope of the Claims; the illustrated embodiment of the invention constituting, therefore, only an example of one of several possible applications of the invention.

DETAILED DESCRIPTION OF THE INVENTION

Figures 1, 2, 3:
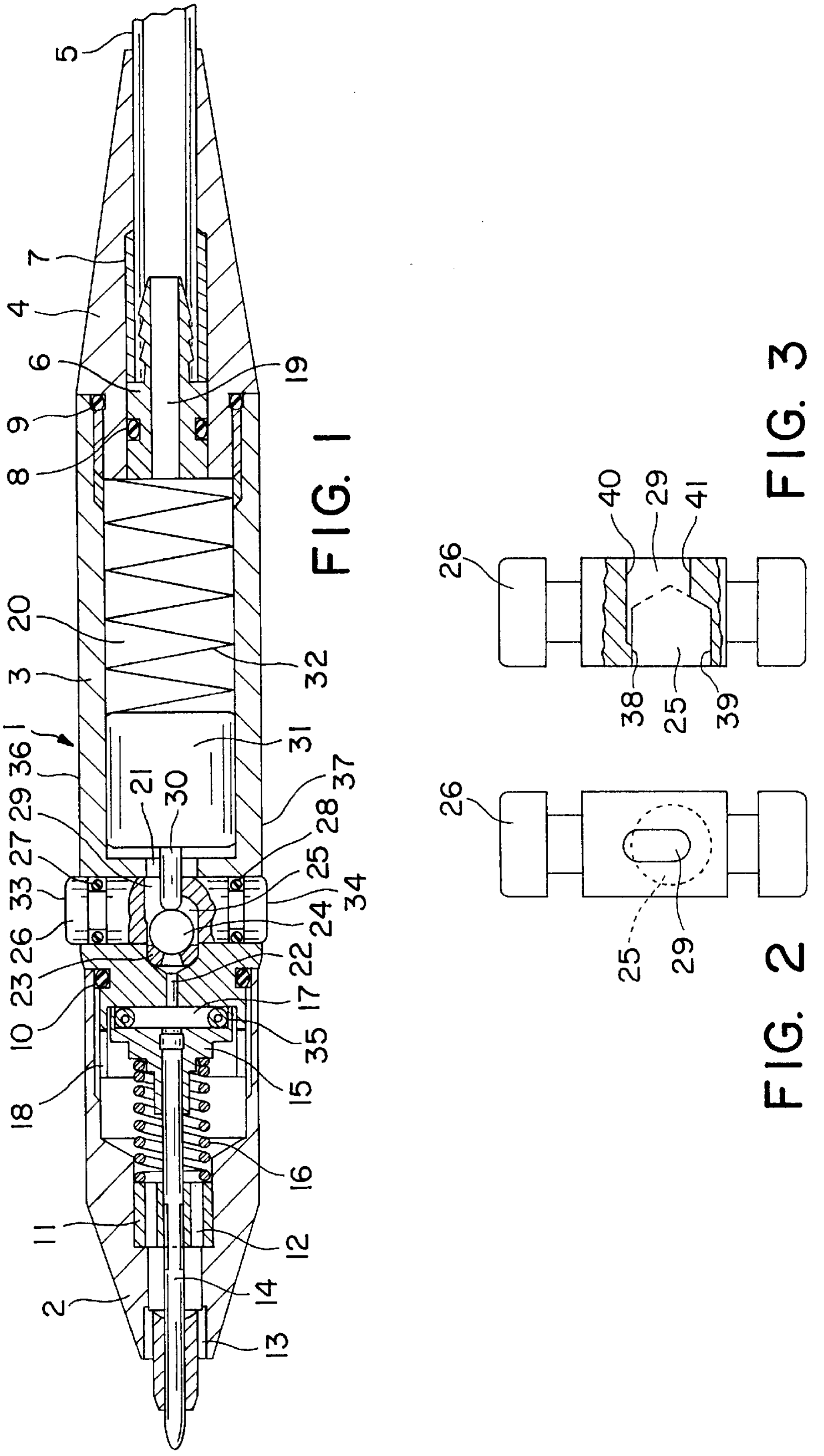
FIG. 1 of the drawing shows a side elevation of the engraving pen.
FIGS. 2 and 3 show, on an enlarged scale, a piston forming part of the governor valve device.

In the drawing, the numeral 1 denotes the pen body or housing as a whole, 2 is its front part, 3 a middle part screwed together with the front part, and 4 a rear part screwed together with the middle part. A hose 5 for the supply of compressed air is inserted into the rear part and is rotatably retained in same with the help of a nipple 6 and a sleeve 7. Seal rings 8, 9 and 10 are provided to seal between nipple and rear part, between rear part and middle part and between middle part and front part. The seals 9 and 10 are thereby also forming a practical friction locking of the thread joints, these therefore not having to be drawn tightly but being conveniently tightened and loosened only with the fingers.

The front part 2 of the housing is fitted with a bushing 11. In the bushing and the front part, holes 12, 13 are provided for exhaust air. Through the brushing and the front part an engraving needle 14 is passed which at its rear end is provided with a drive plate 15. Between the drive plate and the bushing, a compression spring 16 is provided which urges the drive plate and a seal ring 35 fitted inside a flange of the drive plate towards the bottom of a drive chamber 17 provided in the middle part 3 of the housing. A portion of the peripheral walls of the chamber is provided with slots 18.

A supply channel for air from the hose 5 to the drive chamber 17 is formed by a bore 19 in the nipple 6 and a bore 20 with narrowing portions 21, 22 in the middle part of the housing. In the channel portion 21 a seal ring 23 is provided. Against the seal ring a valve ball 24 rests which is provided in a cavity 25 in a piston 26 extending transversally through the pen housing and being sealed against the housing with the help of seal rings 27, 28. The cavity 25 has, on one side of the piston, an opening which faces the seal ring 23. In the opposite side of the piston, a slot 29 is made which communicates with the cavity. Through the slot a pin 30 is inserted which via thicker portion 31 and a spring 32 exerts pressure against the valve ball 24.

The cavity 25 in the piston 26 is deep enough to make room for the whole valve ball 24 inside the piston. With the ball placed in the cavity, the piston is inserted into the middle part 3 of the housing and is turned so that the opening of the cavity faces the seal ring 23 and the slot 29 faces in the opposite direction. With the rear part 4 of the housing unscrewed from the middle part, the member 31 is inserted into the middle part so that the pin 30 passes through the slot 29, whereupon the spring 32 is also inserted and the rear part 4 with its hose 5, nipple 6, sleeve 7 and seal ring 8 fitted in it is screwed to the middle part.

In the position shown from FIG. 1, the pin 30 keeps the valve ball 24 in a sealing position against the seal ring 23. By engaging end surfaces 40, 41 of the slot 29 the pin also limits the movements of the piston 26. According to FIG. 1, the piston is in a closing position, its lower end surface 34 in the figure being maximally pushed towards one side 37 of the middle part 3 and its opposite end surfaces 33 protruding a couple of millimetres outside the opposite side 36 of the middle part. If the piston is now pushed down, so that its upper end surface 33 is no longer protruding outside the surface of the middle part, a limiting wall 38 of the cavity 25 pushes the valve ball a short distance away from its sealing position against the seal ring 23. The member 31 is provided with slots or the like, not shown, for the passage of pressure fluid which will now flow past the valve ball and into the drive chamber 17. The length of the movement of the piston 26 is limited by the pin 30 acting as a stop against an upper end surface 40 of the slot 29.

When pressure fluid flows into the drive chamber 17, the drive plate 15 and the needle 14 move forward a short distance, compressing the spring 16. The seal ring 35 keeps the drive chamber sealed until the slots 18 are reached, whereupon the pressure drops quickly and the spring 16 returns the drive plate to the sealing position. This cycle of forward movement and return movement is repeated until the supply of pressure fluid is stopped by the piston 26 being returned to the position shown from FIG. 1. The frequency of the exemplified engraving pen is around 500–600 strokes per second.

As described in the foregoing, the pin 30 and the slot 29 limit the movements of the piston 26 and secure the piston against being pushed out in its entirety from the middle housing part 3. Therefore, no space requiring heads are required at the ends of the piston to keep it in place, and the movements which are required for the opening and closing of the ball valve 23, 24 are small. The piston can therefore be made so that it protrudes only a couple of millimetres from the housing part 3, which provides for an attractive appearance. The short movements mean that the wall thickness of the housing part will be sufficient for the movements of the seal rings 27, 28 of the piston even in the case of small and narrow tools such as, for example, the exemplified engraving pen. The pen is in FIG. 1 shown on an enlarged scale and has a diameter of only 17 mm where the piston is passed through it.

The pin 30 is suitably made with a thickness which is close to the width of the slot 29. In addition to limiting the movements of the piston 26 axially, the two members therefore also cooperate to prevent turning of the piston. Therefore, the opening 25 of the piston always faces the seal ring 23, so that the valve ball is held in the correct position against the ring.

The piston 26 can be located close to the drive chamber 17, in the front portion of the tool, conveniently accessible for being operated with a finger. The cavity 25 should suitably have a diameter which is approx. 1 mm larger than the diameter of the valve ball 24. When the piston is returned to the position which closes the ball valve, a limiting wall 39 of the cavity will move the ball to a position in which, being acted on by the pin 30 and the flowing pressure fluid, it will snap into a sealing position against the seal ring 23, thereby moving a short distance away from contact with the limiting wall, the movement of which is stopped just before reaching the sealing position of the ball. Therefore, no extremely narrow tolerance is required for the end positions of the piston movements, but the play between the ball and the walls of the cavity ensures that there will be no interference from the walls with the correct sealing position of the ball.

In the embodiment of the invention shown, the piston 26 has equally large pressure absorbing surfaces at both its ends, and its two seal rings 27, 28 are of the same size. The pressure fluid therefore exerts the same amount of force in both axial directions of the piston 26 and is thus not striving to displace the piston axially. If the spring 32 is made relatively weak, the piston 26 will therefore remain in position when its end 33 has been pushed down, and has to be returned by the exertion of pressure against its opposite end.

It is also possible to use a strong spring 32 which exerts such a strong pressure against he valve ball 24, and via the latter against the limiting wall 38 of the cavity 25, that the piston 26 is returned as soon as an operator is no longer with his finger keeping it in its pushed-down position. Which of these alternatives is the most suitable is determined by the type of tool and application. As an alternative to arranging an automatic return of the piston 26 with the help of a strong spring 32, it is possible to obtain the same effect by slightly reducing the sealing diameter between the piston and the housing part 3 at the end portion of the piston which is fitted with the seal ring 28. This results in a smaller amount of pressure from the pressure medium against the seal ring 28 than against the seal ring 27.

As an alternative to making the pin 30 form part of a member 31 acted on by a separate spring 32, it would be possible to shape one end portion of the spring as a pin protruding in the same manner. The design of the mentioned members can also be varied in other ways.

What is claimed is:

1. Governor valve device for a pressure fluid operated tool having a housing (1), a drive chamber 17 provided therein, and a pressure fluid channel (19–22) leading to said drive chamber, said device comprising a seal ring (23) provided in said channel and a valve ball (24) cooperating with said seal ring, characterized therein that the valve ball (24) is provided in a cavity (25), open towards the seal ring (23), in a piston (26) which is passed transversally through said chamber and housing, that a spring-loaded member (30) is arranged to be capable of penetrating into the cavity (25) the urge the valve ball (24) against the seal ring (23), and that the piston (26) is movable in the housing (1) and has sufficient length that at least one of two opposed ends (33, 34) of said piston alternatively protrudes, respectively, from at least one of two opposite sides (36, 37) of the housing, the piston movement causing limiting walls (38, 39) of the cavity of the piston to move the valve ball (24) out of and into, respectively, a sealing position against the seal ring (23) in order to permit and to prevent, respectively, the passage of pressure fluid to the drive chamber (17).

2. Governor valve device in accordance with claim 1, characterized therein that the spring-loaded member (30) is arranged to penetrate into the cavity (25) through an opening in the form of a slot (29) made in the piston (26) and communicating with the cavity (25), and, by engaging end surfaces (40, 41) of the slot, to limit the distance of movement of the piston in its axial direction.

3. Governor valve device in accordance with claim 2, characterized therein that the spring-loaded member (30) is dimensioned to correspond closely to the width of the slot (29) and thereby to prevent the piston (26) from turning relatively to said member (30).

4. Governor valve device in accordance with claim 1, characterized therein the seals comprising seal rings (27, 28) are provided in the region of two opposite ends (33, 34) of the piston (26) in order to absorb, with equally large sealing surfaces, the forces of the pressure medium which act on said piston (26) in two opposed axial directions thereof, said forces thereby not imparting any axial movement to said piston (26).

5. Governor valve device in accordance with claim 1, characterized therein that the valve ball (24) is, via the spring-loaded member (3) acted on by a weak spring (32) which, by exerting pressure on the piston (26) an operator of the tool has imparted a forward movement to said piston causing one of the limiting walls (38) of the cavity (25) to move the valve ball (24) out of sealing position against the seal ring (23), is not capable of producing a counter-pressure of the valve ball (24) against said limiting wall (38) of the cavity (25) which is strong enough to cause a return movement of the piston (26) permitting the valve ball (24) to return to said sealing position when said pressure on the piston (26) has ceased.

6. Governor valve device in accordance with claim 1, characterized therein that, via the spring-loaded member (30), the valve ball (24) is acted on by a spring (32) which, when by exerting pressure on the piston (26) an operator of the tool has imparted a forward movement to said piston causing one of the limiting walls (38) of the cavity (25) to move the valve ball (24) out of sealing position against the seal ring (23), is capable of producing a counter-pressure of the valve ball (24) against said limiting wall (38) of the cavity (25) which causes a return movement of the piston (26) permitting the valve ball (24) to return to said sealing position as soon as said pressure on the piston (26) has ceased.

7. Governor valve device in accordance with claim 1, characterized therein that seals comprising seal rings (27, 28) are provided in the region of two opposite ends (33, 34) of the piston (26) in order to absorb, with among themselves, unequally large sealing surfaces, the forces of the pressure medium which act on said piston (26) in two opposed axial directions thereof, the force acting in one of said directions therefore being stronger than the force acting in the opposite direction and being used to urge the piston (26) in a direction causing the valve ball (24) to return to sealing position against the seal ring (23) after said piston (26) has been moved in an opposite direction causing the valve ball (24) to move out of said sealing position.

8. Governor valve device in accordance with claim 2, characterized therein that seals comprising seal rings (27, 28) are provided in the region of two opposite ends (33, 34) of the piston (26) in order to absorb, with equally sized sealing surfaces, the forces of the pressure medium which act on said piston (26) in two opposed axial directions thereof, said forces thereby not imparting any axial movement to said piston (26).

9. Governor valve device in accordance with claim 3, characterized therein that seals comprising seal rings (27, 28) are provided in the region of two opposite ends (33, 34) of the piston (26) in order to absorb, with equally sized sealing surfaces, the forces of the pressure medium which act on said piston (26) in two opposed axial directions thereof, said forces thereby not imparting any axial movement to said piston (26).

10. Governor valve device in accordance with claim 2, characterized therein that the valve ball (24) is, via the spring-loaded member (30) acted on by a spring (32) which, by exerting pressure on the piston (26), an operator of the tool has imparted a forward movement to said piston causing one of the limiting walls (38) of the cavity (25) to move the valve ball (24) out of sealing position against the seal ring (23), is not capable of producing a counter-pressure of the valve ball (24) against said limiting wall (38) of the cavity (25) which is strong enough to cause a return movement of the piston (26) permitting the valve ball (24) to return to said sealing position when said pressure on the piston (26) has ceased.

11. Governor valve device in accordance with claim 3, characterized therein that the valve ball (24) is, via the spring-loaded member (30) acted on by a spring (32) which, by exerting pressure on the piston (26), on operator of the tool has imparted a forward movement to said piston causing one of the limiting walls (38) of the cavity (25) to move the valve ball (24) out of sealing position against the seal ring (23), is not capable of producing a counter-pressure of the valve ball (24) against said limiting wall (38) of the cavity (25) which is strong enough to cause a return movement of the piston (26) permitting the valve ball (24) to return to said sealing position when said pressure on the piston (26) has ceased.

12. Governor valve device in accordance with claim 4, characterized therein that the valve ball (24) is, via the spring-loaded member (30) acted on by a spring (32) which, by exerting pressure on the piston (26), an operator of the tool has imparted a forward movement to said piston one of the limiting walls (38) of the cavity (25) to move the valve ball (24) out of sealing position against the seal ring (23) is not capable of producing a counter-pressure of the valve ball (24) against said limiting wall (38) of the cavity (25) which is strong enough to cause a return movement of the piston (26) permitting the valve ball (24) to return to said sealing position when said pressure on the piston (26) has ceased.

13. Governor valve device in accordance with claim 2, characterized therein that, via the spring-loaded member (30), the valve ball (24) is acted on by a spring (32), which, when by exerting pressure on the piston (26), an operator of the tool has imparted a forward movement to said piston causing one of the limiting walls (38) of the cavity (25) to move the valve ball (24) out of sealing position against the seal ring (23), is capable of producing a counter-pressure of the valve ball (24) against said limiting wall (38) of the cavity (25) which causes a return movement of the piston (26) permitting the valve ball (24) to return to said sealing position as soon as said pressure on the piston (26) has ceased.

14. Governor valve device in accordance with claim 3, characterized therein that, via the spring-loaded member (30), the valve ball (24) is acted on by a spring (32) which, when by exerting pressure on the piston (26), an operator of the tool has imparted a forward movement to said piston causing one of the limiting walls (38) of the cavity (25) to move the valve ball (24) out of sealing position against the seal ring (23), is capable of producing a counter-pressure of the valve ball (24) against said limiting wall (38) of the cavity (25) which causes a return movement of the piston (26) permitting the valve ball (24) to return to said sealing position as soon as said pressure on the piston (26) has ceased.

15. Governor valve device in accordance with claim 4, characterized therein that, via the spring-loaded member (30), the valve ball (24) is acted on by a spring (32) which, when by exerting pressure on the piston (26), an operator of the tool has imparted a forward movement to said piston causing one of the limiting walls (38) of the cavity (25) to move the valve ball (24) out of sealing position against the seal ring (23), is capable of producing a counter-pressure of the valve ball (24) against said limiting wall (38) of the cavity (25) which causes a return movement of the piston (26) permitting the valve ball (24) to return to said sealing position as soon as said pressure on the piston (26) has ceased.

16. Governor valve device in accordance with claim 2, characterized therein that seals comprising seal rings (27, 28) are provided in the region of two opposite ends (33, 34) of the piston (26) in order to absorb, with unequally sized sealing surfaces, the forces of the pressure medium which act on said piston (26) in two opposed axial directions thereof, the force acting in one of said directions therefore being stronger than the force acting in the opposite direction and being used to urge the piston (26) in a direction causing the valve ball (24) to return to sealing position against the seal ring (23) after said piston (26) has been moved in an opposite direction causing the valve ball (24) to move out of said sealing position.

17. Governor valve device in accordance with claim 3, characterized therein that seals comprising seal rings (27, 28) are provided in the region of two opposite ends (33, 34) of the piston (26) in order to absorb, with unequally sized sealing surfaces, the forces of the pressure medium which act on said piston (26) in two opposed axial directions thereof, the force acting in one of said directions therefore being stronger than the force acting in the opposite direction and being used to urge the piston (26) in a direction causing the valve ball (24) to return to sealing position against the seal ring (23) after said piston (26) has been moved in an opposite direction causing the valve ball (24) to move out of said sealing position.

18. Governor valve device in accordance with claim 5, characterized therein that seals comprising seal rings (27, 28) are provided in the region of two opposite ends (33, 34) of the piston (26) in order to absorb, with unequally sized sealing surfaces, the forces of the pressure medium which act on said piston (26) in two opposed axial directions thereof, the force acting in one of said directions therefore being stronger than the force acting in the opposite direction and being used to urge the piston (26) in a direction causing the valve ball (24) to return to sealing position against the seal ring (23) after said piston (26) has been moved in an opposite direction causing the valve ball (24) to move out of said sealing position.

* * * * *

UNITED STATES PATENT AND TRADEMARK OFFICE

CERTIFICATE OF CORRECTION

PATENT NO. : 6,488,264 B2
DATED : December 3, 2002
INVENTOR(S) : Henry Wiklund

It is certified that error appears in the above-identified patent and that said Letters Patent is hereby corrected as shown below:

Column 3,
Line 65, delete “the” (second occurrence), and substitute -- and --.

Column 4,
Line 21, delete “large”, and substitute -- sized --.
Line 28, delete “(3)” and substitute -- (30), --.
Line 28, delete “weak”.
Line 29, add -- , -- after “piston (26)”.
Line 42, add -- , -- after “piston (26)”.
Line 55, delete “among themselves,”.
Line 56, delete “large”, and substitute -- sized --.

Column 5,
Line 39, after “piston”, add -- causing --.
Line 41, after “23”, add -- , --.

Signed and Sealed this

Twentieth Day of May, 2003

JAMES E. ROGAN
*Director of the United States Patent and Trademark Office*